US012565046B2

(12) United States Patent
Ishibe et al.

(10) Patent No.: US 12,565,046 B2
(45) Date of Patent: Mar. 3, 2026

(54) LIQUID STORING CARTRIDGE AND PRINTER

(71) Applicant: BROTHER KOGYO KABUSHIKI KAISHA, Nagoya (JP)

(72) Inventors: Akinari Ishibe, Okazaki (JP); Yuma Tanabe, Nagoya (JP); Satoru Oki, Nagoya (JP); Sosuke Kuroyanagi, Kariya (JP); Genki Hoshino, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 240 days.

(21) Appl. No.: 18/192,493

(22) Filed: Mar. 29, 2023

(65) Prior Publication Data

US 2023/0321990 A1 Oct. 12, 2023

(30) Foreign Application Priority Data

Mar. 31, 2022 (JP) ................................ 2022-061240

(51) Int. Cl.
*B41J 2/175* (2006.01)

(52) U.S. Cl.
CPC ......... *B41J 2/1752* (2013.01); *B41J 2/17526* (2013.01)

(58) Field of Classification Search
CPC .... B41J 2/175; B41J 2/17503; B41J 2/17506; B41J 2/17509; B41J 2/1752; B41J 2/17523; B41J 2/17526; B41J 2/1753; B41J 2/17553
See application file for complete search history.

(56) References Cited

U.S. PATENT DOCUMENTS

| | | | | |
|---|---|---|---|---|
| 7,101,021 | B2 * | 9/2006 | Aruga .................... | H05K 1/117 347/49 |
| 10,518,545 | B2 | 12/2019 | Ono et al. | |
| 2007/0206076 | A1 | 9/2007 | Seino et al. | |
| 2011/0205284 | A1 | 8/2011 | Yoshino et al. | |
| 2015/0165780 | A1 * | 6/2015 | Shiota .................... | B41J 2/1714 347/86 |
| 2015/0273501 | A1 | 10/2015 | Naito et al. | |
| 2016/0059568 | A1 * | 3/2016 | Nakata ................. | B41J 2/17546 347/86 |

(Continued)

FOREIGN PATENT DOCUMENTS

| | | |
|---|---|---|
| JP | 1291731 S | 1/2007 |
| JP | 2011-167966 A | 9/2011 |

(Continued)

OTHER PUBLICATIONS

Extended European Search Report for the related European Patent Application No. 23162767.0 dated Aug. 17, 2023.

*Primary Examiner* — Anh T Vo
(74) *Attorney, Agent, or Firm* — Kenealy Vaidya LLP

(57) ABSTRACT

There is provided a liquid storing cartridge including: a casing which has a bottom surface and which is configured to store a liquid, the casing having a supply port configured to supply the liquid from the casing to an outside of the casing; a circuit board having an electric contact; and a circuit board holder which is provided on the casing and which is configured to hold the circuit board. The circuit board is provided at a position being more apart from the bottom surface of the casing than the supply port is.

9 Claims, 11 Drawing Sheets

(56) References Cited

U.S. PATENT DOCUMENTS

| | | | |
|---|---|---|---|
| 2016/0200113 | A1 | 7/2016 | Nanjo et al. |
| 2017/0085031 | A1 | 3/2017 | Ishizawa et al. |
| 2017/0184998 | A1 | 6/2017 | Itabashi |
| 2019/0299635 | A1 | 10/2019 | Ono et al. |
| 2020/0070527 | A1 | 3/2020 | Hayashi |

FOREIGN PATENT DOCUMENTS

| | | | |
|---|---|---|---|
| JP | 2015-193093 | A | 11/2015 |
| JP | 2016-185649 | A | 10/2016 |
| JP | 2017-52220 | A | 3/2017 |
| JP | 2017-56706 | A | 3/2017 |
| JP | 2017-116826 | A | 6/2017 |
| JP | 2017-120351 | A | 7/2017 |
| JP | 2019-171736 | A | 10/2019 |
| JP | 2020-32653 | A | 3/2020 |
| JP | 2020-111032 | A | 7/2020 |
| WO | 2015/041365 | A1 | 3/2015 |
| WO | 2019186858 | A1 | 10/2019 |

* cited by examiner

LIQUID STORING CARTRIDGE AND PRINTER

REFERENCE TO RELATED APPLICATIONS

This application claims priority from Japanese Patent Application No. 2022-61240 filed on Mar. 31, 2022. The entire content of the priority application is incorporated herein by reference.

BACKGROUND ART

A printer provided with a detachable ink cartridge is known. In such printers, the ink cartridge may accommodate an ink container, and the ink container may be provided with an ink-leading out part and a circuit board.

DESCRIPTION

In the printer described in Japanese Patent Application Laid-Open No. 2015-193093, the circuit board is provided on a location which is obliquely below the ink leading out part. An ink in the ink container is supplied to the printer from the ink leading out part.

In the printer described in Japanese Patent Application Laid-Open No. 2015-193093, since the circuit board is provided at the location obliquely below the ink leading out part, there is such a possibility that, in a case that the ink cartridge is inserted or removed with respect to the printer, the ink might scatter from the ink leading out part and might dirty the circuit board. In a case that the circuit board is dirtied with the ink, there is such a problem that there might be any conduction failure of an electric contact of the circuit board.

An object of the present disclosure is to provide a liquid storing cartridge and a printer each of which is capable of lowering a possibility that a liquid might adhere to an electric contact of a circuit board of a liquid container and of improving reliability of conduction of the electric contact of the circuit board.

A liquid storing cartridge according to a first aspect of the present disclosure includes:

- a casing which has a bottom surface and which is configured to store a liquid, the casing having a supply port configured to supply the liquid from the casing to an outside of the casing;
- a circuit board having an electric contact; and
- a circuit board holder which is provided on the casing and which is configured to hold the circuit board,
- wherein the circuit board is provided at a position being more apart from the bottom surface of the casing than the supply port is.

According to the first aspect, since the circuit board is provided at the position which is more apart from the bottom surface than the supply port is, the possibility that a liquid scattered from the supply port might adhere to the electric contact of the circuit board is lowered. Accordingly, the reliability of the conduction of the electric contact of the circuit board is improved.

A printer according to a second aspect of the present disclosure includes the above-described liquid storing cartridge. According to the second aspect, in a case that the liquid storing cartridge is inserted or removed with respect to the printer, the possibility that a liquid scattered from the supply port of the liquid container might adhere to the electric contact of the circuit board is lowered. Accordingly, the reliability of the conduction of the electric contact of the circuit board is improved.

Figure 1:
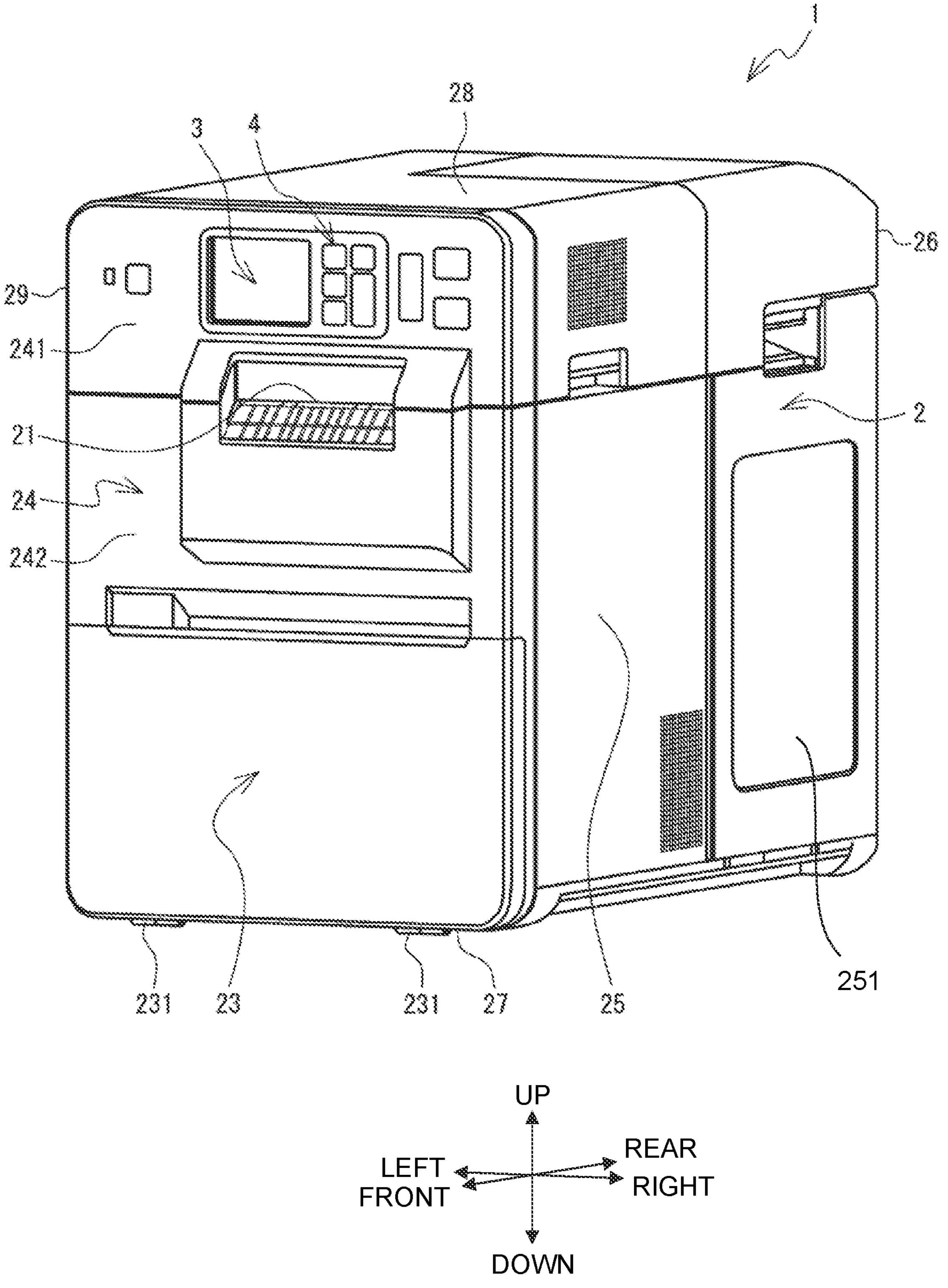
FIG. 1 is a perspective view of a printer 1.
Figure 6:
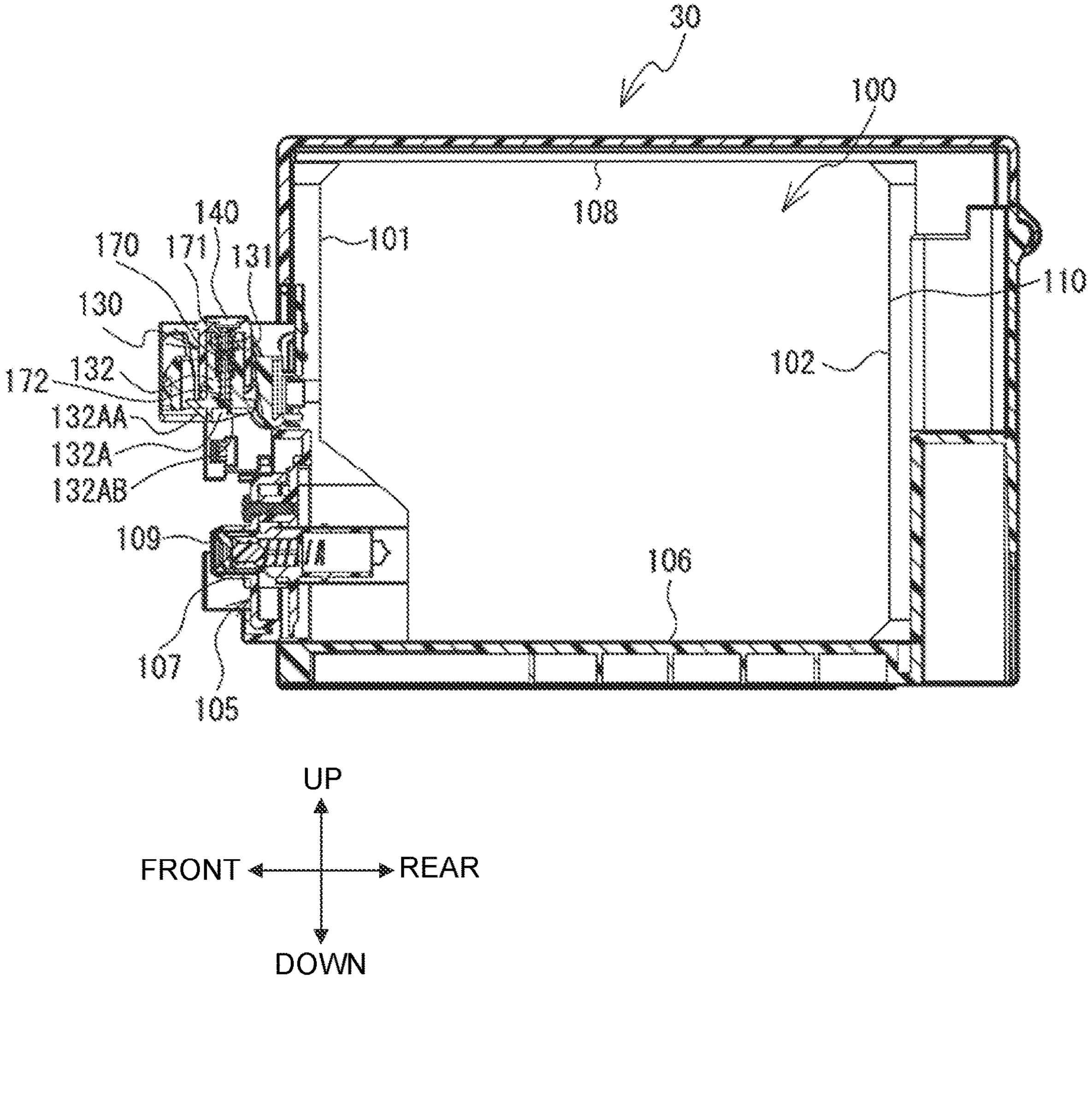
FIG. 6 is a vertical cross-sectional view of the cartridge 30.
Figure 7:
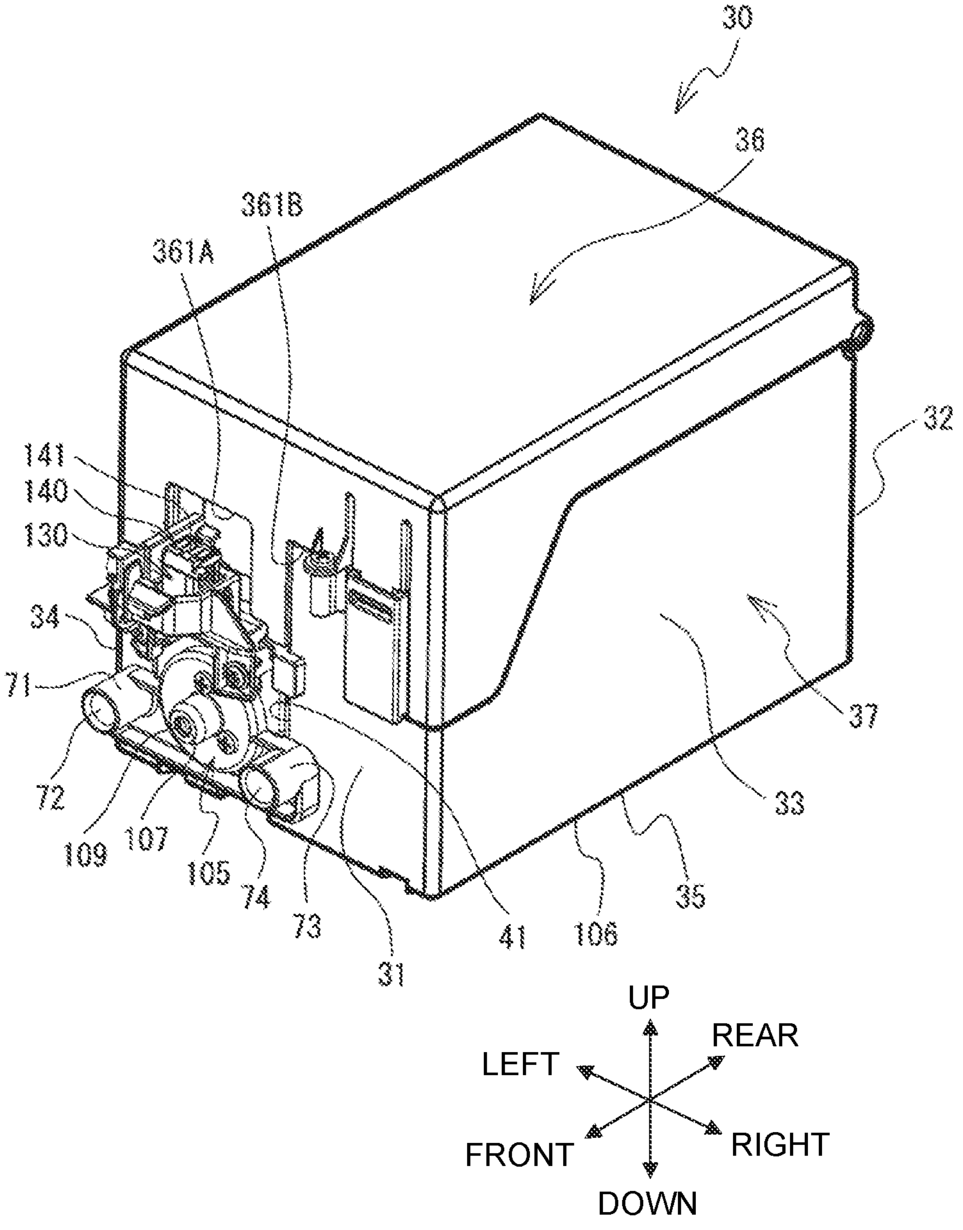
FIG. 7 is a perspective view of the cartridge 30.
Figure 8:
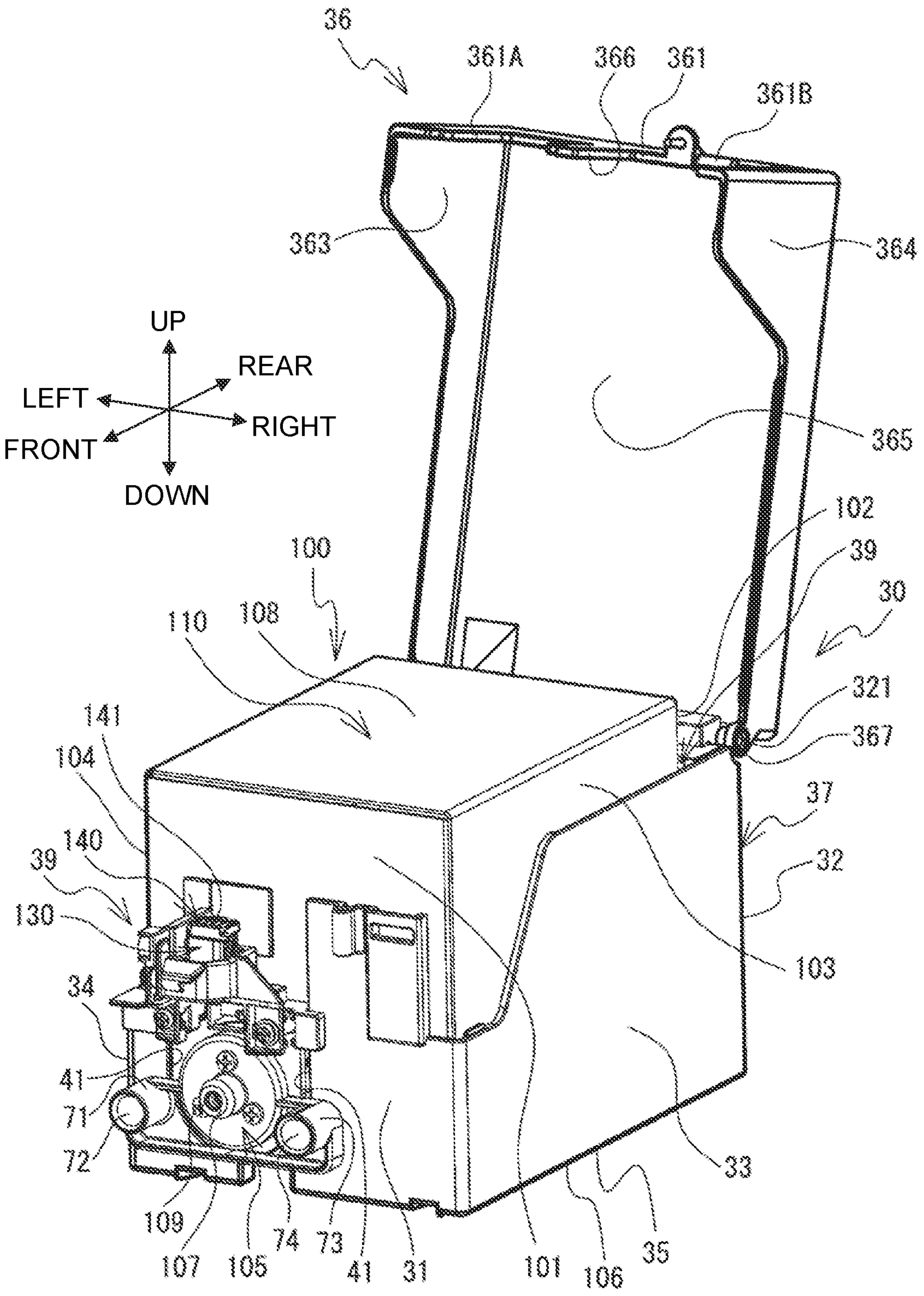
FIG. 8 is a perspective view depicting a state that a liquid container 100 is installed in the cartridge 30.

A printer 1 according to an embodiment of the present disclosure will be explained, sequentially with reference to the drawings. In the present embodiment, a mechanical element in the drawings indicates an actual scale in each of the drawings. The drawings which are referred to are used for explaining a technical feature which may be adopted by the present disclosure, and the configuration of an apparatus which is described is not meant to be limited only thereto, and is a mere example for explanation. In the explanation of the present embodiment, a left lower side, a right upper side, a right lower side, a left upper side, an upper side and a lower side of FIG. 1 are, respectively, a front side, a rear side, a right side, a left side, an upper side and a lower side of the printer 1. A left lower side, a right upper side, a right lower side, a left upper side, an upper side and a lower side of FIG. 7 are, respectively, a front side, a rear side, a right side, a left side, an upper side and a lower side of the cartridge 30. FIGS. 1 to 5 and FIGS. 9 to 11 are drawings with the directions of the printer 1, whereas FIGS. 6 to 8 are drawings with the directions of the cartridge 30, and the cartridge 30 is installed in the printer 1 in a state that the front surface of the cartridge 30 is oriented to face the rear surface of the printer 1.

<Configuration of Printer 1>

The configuration of the printer I will be explained, with reference to FIG. 1. The printer 1 is an ink-jet printer which performs printing on a medium having an elongated shape. In a case that print data is inputted to an input terminal (omitted in the drawings), the printer 1 prints the print data on the medium by a printing mechanism (omitted in the drawings) built in the printer 1, and discharges the medium from a discharge port 21 (to be described later on). As depicted in FIG. 1, the printer 1 is provided with a casing 2. The casing 2 has a shape of rectangular parallelepiped having a size placeable or arrangeable on a table or desk, and has a front wall 24, a right wall 25, a rear wall 26, a left wall 29, a bottom wall 27, an upper wall 28 and a front cover 23.

The front wall 24 is provided on a front surface of the casing 2, and has, from the upper side toward the lower side, a first front wall 241 and a second front wall 242. Each of the first front wall 241 and the second front wall 242 is rectangular which is long in a left-right direction as seen from the front side. The first front wall 241 is provided on an upper part on the front side of the casing 2, and the second front wall 242 is provided at a location which is below the first front wall 241 and which is at the center on the front side of the casing 2. Each of the right wall 25, the rear wall 26 and the left wall 29 is rectangular which is long in an up-down direction. Further, each of the bottom wall 27 and the upper wall 28 is rectangular which is long in a front-rear direction.

The discharge port 21 is provided on a boundary between the first front wall 241 and the second front wall 242. The discharge port 21 is a rectangular opening which is long in the left-right direction as seen from the front side, and discharges a medium having printing performed thereon. The first front wall 241 is provided with a displaying part 3 and an operating part 4. The displaying part 3 displays a letter, an image, etc. The operating part 4 is provided on the right side with respect to the displaying part 3. The operating part 4 is provided with a touch panel or a plurality of buttons via which a variety of kinds of instructions are inputted.

The front cover 23 is provided on the front surface of the casing 2 and below the second front wall 242. The front cover 23 is a rectangular lid as seen from the front side, and is provided with a pair of hinges 231 on a lower end part of the front cover 23. By the pair of hinges 231, the front cover 23 is rotatable to a close position (see FIG. 1) at which the front cover 23 closes an opening part 11 and an opening part 12 of an accommodating part 6, depicted in FIG. 3, and to an open position at which the front cover 23 releases (that is, does not cover) the opening part 11 and the opening part 12.

Figure 2:
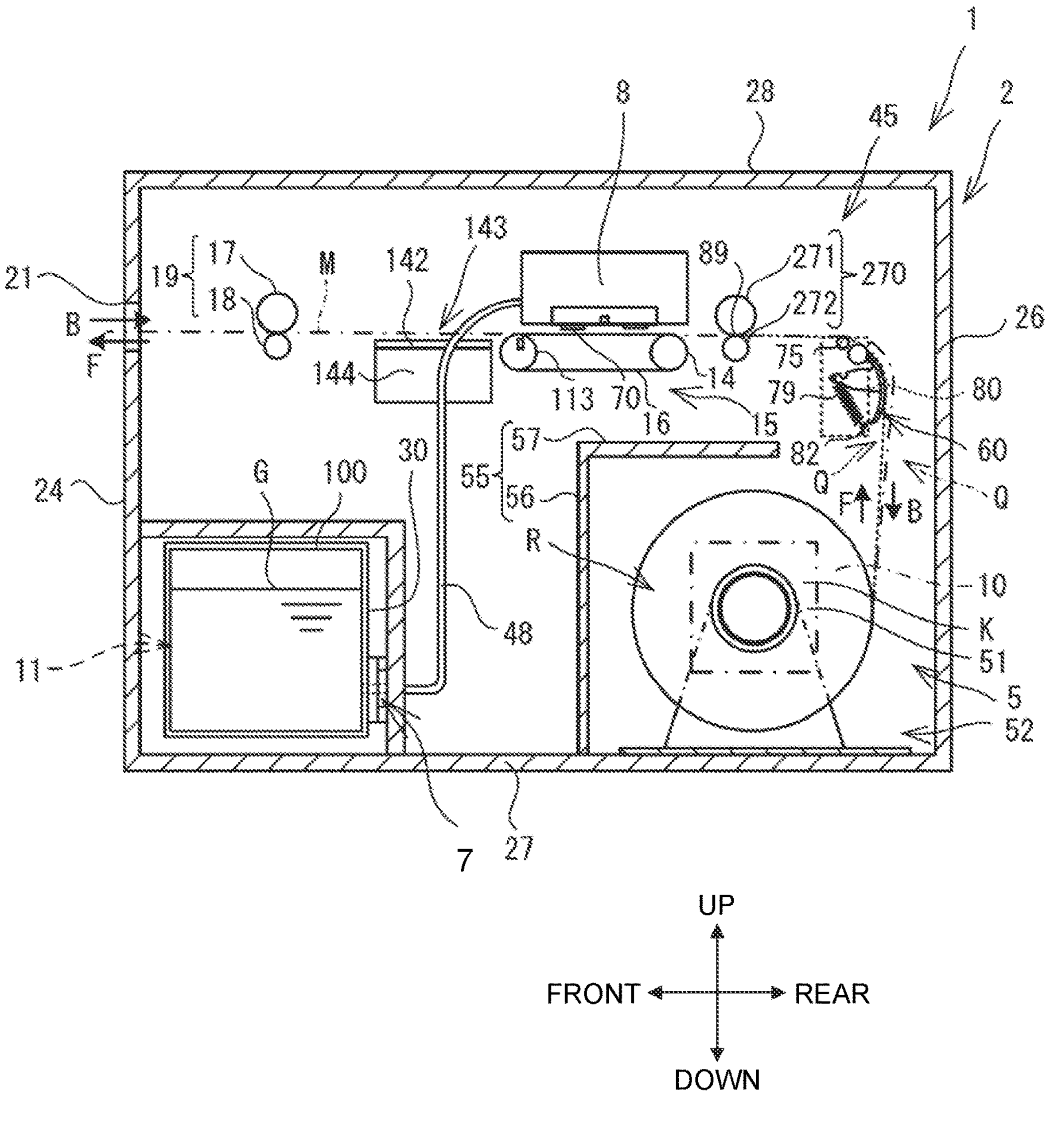
FIG. 2 is a vertical cross-sectional view depicting the internal configuration of the printer 1.

As depicted in FIG. 2, the printer 1 accommodates, in the inside of the casing 2, an ink-jet head 8, a cartridge 30, an ink tube 48, a conveying device 45, a partition wall 55 and a fixing unit 143.

The ink-jet head 8 prints an image on a medium M supplied from a supplying part 5. The ink-jet head 8 is provided with a plurality of nozzles 70 which discharges or ejects an ink G in a discharge direction. The ink-jet head 8 prints the image on the medium M by discharging ink G from the plurality of nozzles 70. The discharge direction is downward, and the ink-jet head 8 is provided at a location above a conveying route Q of the medium M, while the ink jet head 8 assumes a posture in which the plurality of nozzles 70 is oriented downward. The conveying route Q is a route or path along which the medium M is conveyed since the medium M is fed out from the supplying part 5 and until the medium M is discharged from the discharge port 21 to the outside of the casing 2.

The cartridge 30 is accommodated in the opening part 11. The cartridge 30 accommodates a liquid container 100 which stores the ink in the inside thereof, and is installed in an installment part 7 of the opening part 11. The details of this will be described later on. The ink tube 48 is arranged in the inside of the casing 2 and connects the installment part 7 and the ink-jet head 8. The ink G in the inside of the cartridge 30 is supplied, via the ink tube 48, from the cartridge 30 to the ink-jet head 8.

The conveying device 45 is provided with the supplying part 5, conveying parts 270, 10, 15 and 19, a supporting part 80, a tension applying part 60 and a rotary body 75. The supplying part 5 is provided on a space which is located on the left side of a side cover 251 at the close position and which is located at a rear lower part of the printer 1 and surrounded by the partition wall 55 and the rear wall 26. The supplying part 5 holds a roll R. The supplying part 5 is provided with a shaft part 51 and a magazine 52. The shaft part 51 extends in the left-right direction, and is inserted into a paper tube K of the roll R. The magazine 52 is a supporting stand which has a shape of a letter "U" as seen from the front side. The magazine 52 supports both of left and right end parts of the shaft part 51 so that the shaft part 51 is rotatable about an axis extending in the left-right direction. The shaft part 51 is supported by the magazine 52 in a state that the shaft part 51 is detachable from the magazine 52. The magazine 52 is supported by the printer 1 in a state that the magazine is detachable from the printer 1.

An operator who replaces the roll R arranges the side cover 251 at the open position, takes out the magazine 52 from the inside of the casing 2 and performs a replacing operation of the roll R.

The conveying part 270 conveys the medium M in a conveying direction F in which the medium M is conveyed from the supplying part 5 toward the ink-jet head 8 and to a retuning direction B which is opposite or reverse direction to the conveying direction F. The conveying direction F is a direction along the conveying route Q which is from the supplying part 5 toward the ink-jet head 8. A part, of the conveying direction F, from the suppling part 5 up to the tension applying part 60 is a direction which changes depending on a remaining amount of the medium M, and is generally upward. A part, of the conveying direction F, from the tension applying part 60 up to the discharge port 21 is generally frontward.

The conveying part 270 is provided at a location on an upstream side in the conveying direction F with respect to the ink-jet head 8, and on a downstream side in the conveying direction F with respect to the supplying part 5. Namely, the conveying part 270 is provided between the ink-jet head 8 and the supplying part 5 in the conveying route Q of the medium M. The conveying part 270 has a conveying roller 271 which rotates about an axis extending in the left-right direction and a pinch roller 272 which rotates about an axis extending in the left-right direction. The conveying part 270 performs a nip conveyance, by the conveying roller 271 and the pinch roller 272, of conveying the medium M in the conveying direction F which is from the supplying part 5 toward the ink-jet head 8.

The conveying part 10 is provided on the upstream side in the conveying direction F with respect to the conveying part 270, and conveys the medium in the conveying direction F and the retuning direction B. The conveying part 10 rotates the roll R held by the supplying part 5, conveys the medium M in the returning direction B, and takes (winds) the medium M on the roll R. The conveying part 10 detachably engages with the shaft part 51 of the supplying part 5. The conveying part 10 rotates the roll R held by the supplying part 5, conveys the medium M in the conveying direction F, and feeds the medium M from the roll R toward the ink-jet head 8.

The supporting part 80 is provided on the upstream side in the conveying direction F with respect to the conveying part 270 and on the downstream side in the conveying direction F with respect to the conveying part 10, and supports the tension applying part 60 and the rotary body 75. The tension applying part 60 is provided between the conveying part 270 and the conveying part 10 in the conveying route Q. The tension applying part 60 is arranged at a location above the supplying part 5, and is supported on the upstream side in the conveying direction F with respect to the conveying part 270, in a state that the tension applying part 60 is capable of rocking about an axis extending in the left-right direction. The tension applying part 60 makes contact with the medium M and bends the medium M. With this, the tension applying part 60 imparts a tension to the medium M. The tension is a tension acting in a direction opposite to an advancing direction of the medium M.

The rotary body 75 is supported to be rotatable about an axis extending in the left-right direction, on the upstream side in the conveying direction F with respect to the conveying part 270 and on the downstream side in the conveying direction F with respect to at an end part, of the tension applying part 60, on the upstream side in the conveying direction F, namely a lower end part of the tension applying part 60.

The conveying part 15 is provided on a location below the ink-jet head 8 and on the downstream side in the conveying direction F with respect to the conveying part 270, and conveys the medium M in the conveying direction F. The conveying part 15 is provided with a driving roller 113, a driven roller 14 and an endless belt 16. The driving roller 113 and the driven roller 14 are separated from each other in the front-rear direction. The endless belt 16 is stretched over the driving roller 113 and the driven roller 14. Accompanying with the rotation of the endless belt 16, the driven roller 14 is rotated. A position in the up-down direction of an upper end of an outer circumferential surface of the endless belt 16 is substantially same with a position in the up-down direction of a nip point 89 at which the medium M is nipped by the conveying part 270. The upper end of the outer circumferential surface of the endless belt 16 faces or is opposed to the plurality of nozzles 70 of the ink-jet head 8. The upper end of the outer circumferential surface of the endless belt 16 conveys the medium M in the conveying direction F in a state that the medium M which is (being) conveyed between the conveying part 270 and the conveying part 19 is attracted, by suction from a position below the medium M by a static electricity or a negative pressure, to the endless belt 16.

The fixing unit 143 is arranged on the downstream side in the conveying direction F with respect to the ink-jet head 8 and on the upstream side in the conveying direction F with respect to the conveying part 19. Further, the fixing unit 143 is provided on a location below the conveying route Q. The fixing unit 143 is provided with a heat source 144 which is capable of performing conduction heating and a heating plate (hot plate) 142 which is heated by the heat source 144. The heating plate 142 supports the medium M which passes the conveying route Q from a position below the medium M. The medium M is heated by the heating plate 142, thereby causing the ink G discharged onto the medium M by the ink-jet head 8 to be fixed on the medium M.

The conveying part 19 is provided on the downstream side in the conveying direction F with respect to the ink-jet head 8 and the fixing unit 143 and on the upstream side in the conveying direction F with respect to the discharge port 21, and conveys the medium M in the conveying direction F and in the returning direction B. The conveying part 19 has a conveying roller 17 and a pinch roller 18 each of which rotates about an axis extending in the left-right direction, and performs a nip conveyance, by the conveying roller 17 and the pinch roller 18, of conveying the medium M while nipping the medium M between the conveying roller 17 and the pinch roller 18 in the up-down direction.

In a case that a printing processing is executed, a controller of the printer 1 drives the conveying parts 270, 10, 15 and 19 so as to convey the medium M. The printer 1 adjusts a driving amount of each of the conveying parts 270 and 10 so that the tension is applied to the medium M by the tension applying part 60. The controller of the printer 1 drives the ink-jet head 8 synchronizing with the conveyance of the medium M, thereby discharging, onto the medium M, the ink G supplied from the cartridge 30 via the ink tube 48. The controller of the printer 1 drives the heat source 144 so as to fix, to the medium M, the ink G on the medium M. The medium M is discharged from the discharge port 21 to the outside of the casing 2.

<Configuration of Accommodating Part 6>

Figure 3:
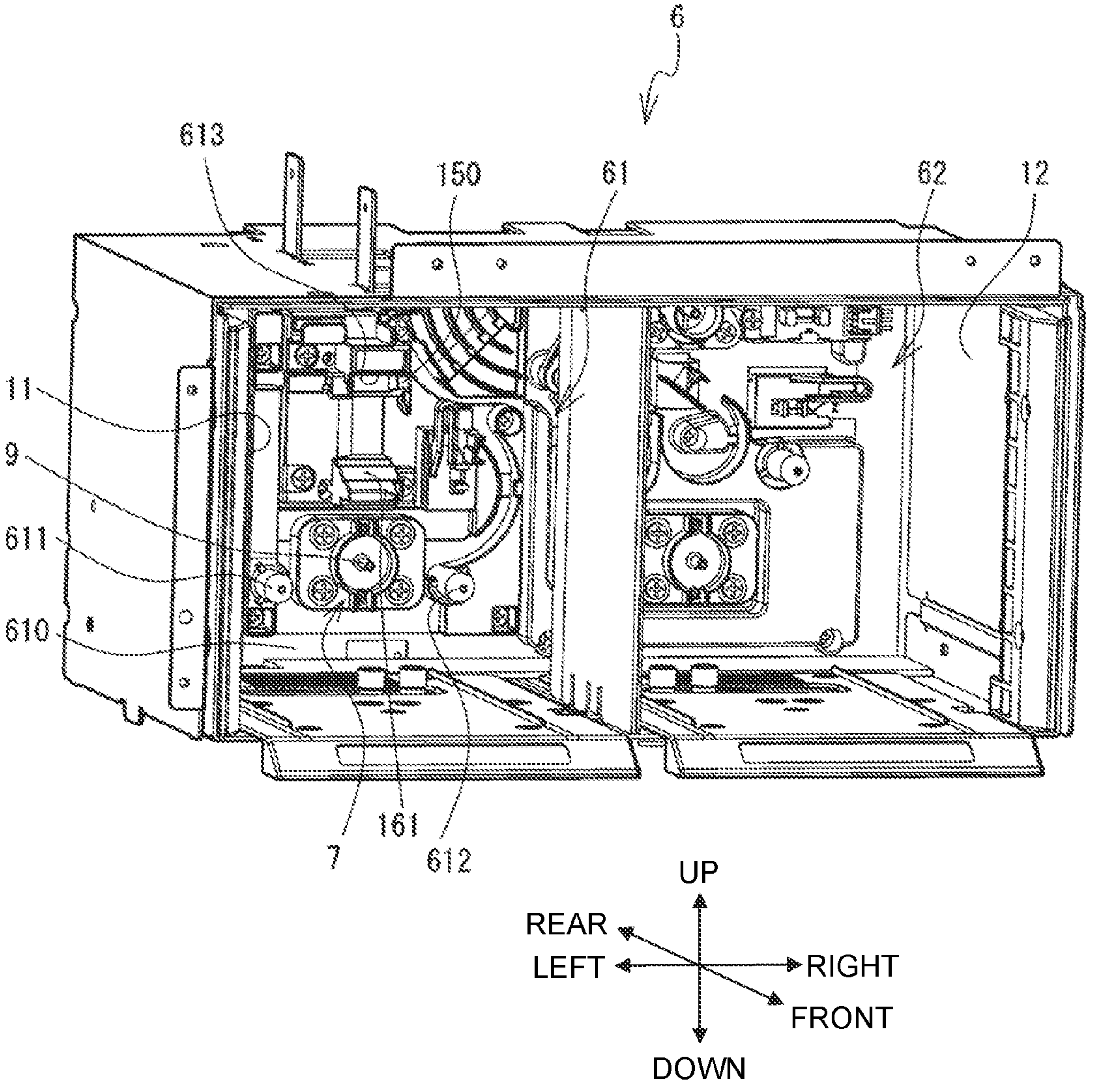
FIG. 3 is a perspective view of an accommodating part 6.
Figure 4:
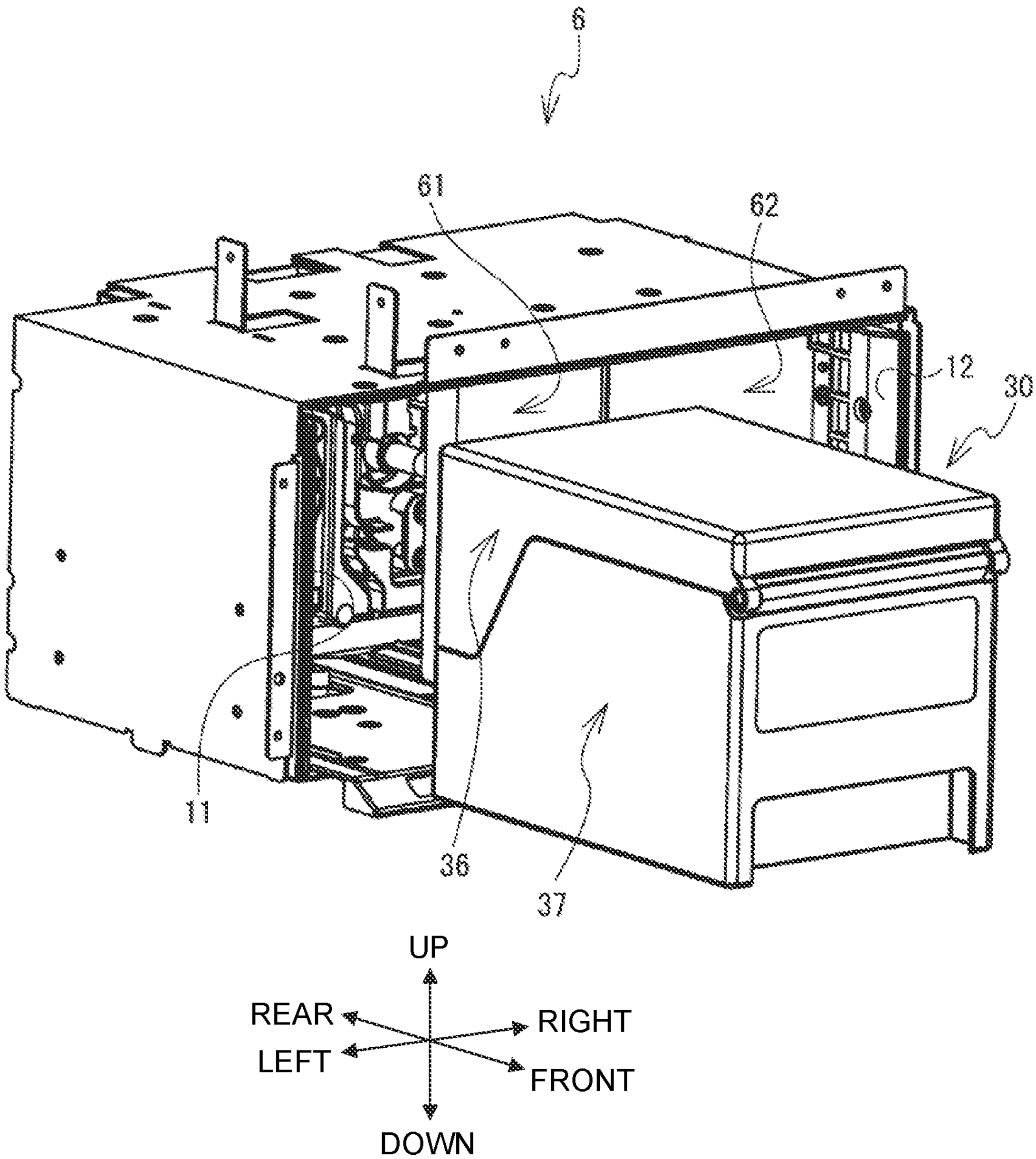
FIG. 4 is a perspective view depicting a state that a cartridge 30 is being installed in the accommodating part 6.
Figure 5:
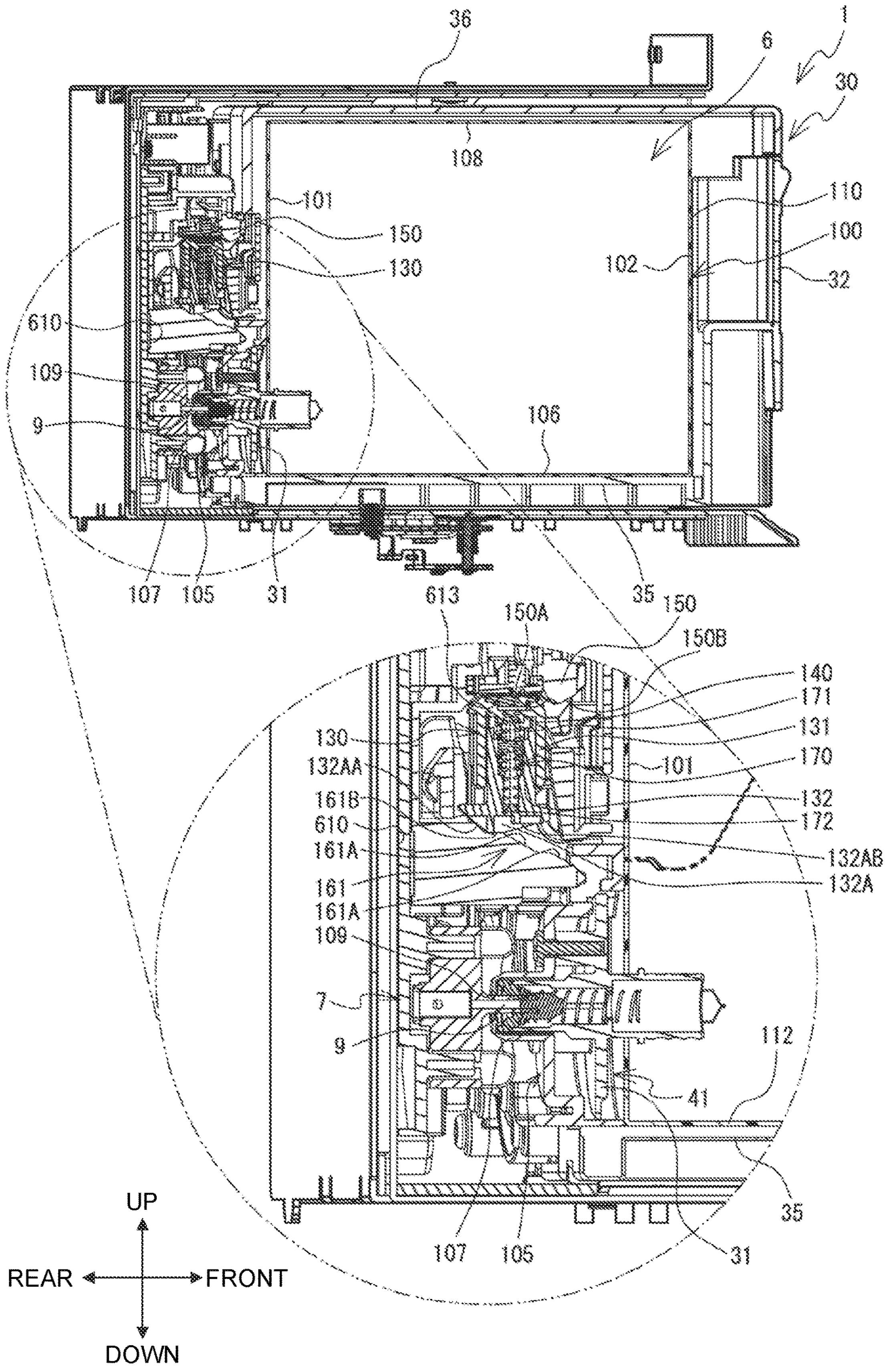
FIG. 5 is a vertical cross-sectional view depicting a state that the cartridge 30 is installed in the accommodating part 6.

With reference to FIGS. 3 to 5, an explanation will be given about the configuration of the accommodating part 6 provided on the inside of the printer 1. FIGS. 3 to 5 depict only the accommodating part 6, and omits other configurations of the printer 1. The accommodating part 6 is provided on the inside of the front cover 23 of the printer 1. The accommodating part 6 has a shape of a rectangular parallelepiped which extends in the left-right direction, and is provided with, from the left side toward the right side, a first accommodating part 61 and a second accommodating part 62. The first accommodating part 61 and the second accommodating part 62 are each a space having a shape of a rectangular parallelepiped, and provided, respectively, with an opening part 11 and an opening part 12 which are opened frontward. In a case that the front cover 23 is turned from the close state to the open state, the opening parts 11 and 12 of the accommodating part 6 are exposed. Each of the opening parts 11 and 12 is a rectangular opening. The first accommodating part 61 accommodates a cartridge 30 (to be described later on).

As depicted in FIGS. 3 and 5, the first accommodating part 61 is provided with a rear wall 610. The rear wall 610 is a rectangular wall which is provided on the rearmost side in the first accommodating part 61, and extends in the up-down direction and the left-right direction. The rear wall 610 is provided with the installment part 7. The installment part 7 is provided on a location below a center in the up-down direction of the rear wall 610. In a case that the cartridge 30 is accommodated in the first accommodating part 61, a tap (tap unit, mouth stopper, mouth plug) 105 of the liquid container 100 accommodated in the cartridge 30 is installed in the installment part 7. The installment part 7 is provided with a supply needle 9 which projects frontward. The supply needle 9 is hollow inside. In a case that the cartridge 30 is accommodated in the first accommodating part 61 and that the tap 105 is installed in the installment part 7, the supply needle 9 enters into the inside of a supply port 109 of a connecting part 107 of the liquid container 100. Accordingly, the ink inside the liquid container 100 is supplied to the ink-jet head 8 of the printer 1.

Further, as depicted in FIG. 3, a pair of positioning (alignment) projections 611 and 612 is provided on the rear wall 610 of the first accommodating part 61. The positioning projection 611 and the positioning projection 612 are provided, respectively, on positions which are symmetrical in the left-right direction with respect to the supply needle 9. The positioning projection 611 and the positioning projection 612 project frontward. A front end of each of the positioning projection 611 and the positioning projection 612 protrude frontward farther than a front end of the supply needle 9. In a case that the cartridge 30 is inserted into the first accommodating part 61, the positioning projection 612 fits into a circular hole 72 of a first positioning part 71 (to be described later on) and the positioning projection 611 fits into an elongated hole (slot) 74 of a second positioning part 73 (to be described later on).

A maintenance box (omitted in the drawings) is accommodated in the second accommodating part 62. The maintenance box has a shape of a rectangular parallelepiped, similarly to the cartridge 30. The maintenance box is fixed in a state that the maintenance box is accommodated in the second accommodating part 62. An accommodating body accommodating a nozzle cleaning liquid for maintenance is accommodated in the maintenance box. At a time of performing maintenance, the nozzle cleaning liquid is supplied to the ink-jet head 8 from the maintenance box.

<Configuration of Cartridge 30>

As depicted in FIG. 7, the cartridge 30 has a shape of a rectangular parallelepiped, and is provided with a lower case 37 and a cover 36. As depicted in FIG. 8, the cartridge 30 accommodates or stores the liquid container 100 in the inside of the lower case 37. The liquid container 100 is a container which accommodates or stores a liquid. The liquid container 100 is a pouch made of a synthetic resin. In the following, an example that the ink is stored in the liquid container 100 will be explained.

As depicted in FIGS. 7 and 8, the lower case 37 is provided with a front wall 31, a rear wall 32, a right wall 33, a left wall 34 and a bottom wall 35. The bottom wall 35 is a rectangular plate which is long in the front-rear direction. The front wall 31 extends upward from a front end of the bottom wall 35. A tap engaging part 41 is provided on a left lower part of the front wall 31. The tap engaging part 41 is an opening part which penetrates the front wall 31 in the front-rear direction and which is opened upwardly. As depicted in FIG. 8, the tap 105 of the liquid container 100 engages with the tap engaging part 41 from a position above the tap engaging part 41. The front wall 31 supports the tap 105 of the liquid container 100. An opening 39 which is opened upward is defined by the front wall 31, the right wall 33, the left wall 34 and the rear wall 32. The liquid container 100 is accommodated in the inside of the opening 39.

As depicted in FIG. 8, the cover 36 is provided with an upper wall 365, a front wall 361, a rear wall (omitted in the drawings), a right wall 364 and a left wall 363. A pair of bearing parts 367 of the cover 36 is rotatably supported, respectively, by a pair of shafts 321 of the lower case 37, thereby causing the cover 36 to rotate to a close state in which the cover 39 covers the opening 39 and to an open state in which the cover 39 does not cover the opening 39. In the open state depicted in FIG. 8, the operator is capable of attaching and detaching the liquid container 100 with respect to the cartridge 30. In a case that the cover 36 is in the closed state, the cartridge 30 is accommodatable in the accommodating part 6 of the printer 1.

<Configuration of Liquid Container 100>

With reference to FIGS. 5 and 8, the configuration of the liquid container 100 will be explained. The liquid container 100 stores, as an example, an ink. An example of the ink is a black ink. The liquid container 100 is provided with a case 110, and the case 110 is formed of a pouch made of a synthetic resin. The case 110 has a shape of a rectangular parallelepiped which is long in the front-rear direction. As depicted in FIG. 8, the case 110 is provided with a front surface 101, a rear surface 102, a right side surface 103, a left side surface 104, a bottom surface 106 (see FIG. 5) and an upper surface 108. The bottom surface 106 and the upper surface 108 are each a rectangle which is long in the front-rear direction. The front surface 101 is a rectangle which extends upward from a front end of the bottom surface 106. The right side surface 103 is a rectangle which extends upward from a right end of the bottom surface 106 and which is long in the front-rear direction. The left side surface 104 is a rectangle which extends upward from a left end of the bottom surface 106 and which is long in the front-rear direction. The rear surface 102 is a rectangle which extends upward from a rear end of the bottom surface 106.

As depicted in FIG. 8, the tap 105 is provided on a left lower part of the front surface 101. The tap 105 is provided with a connecting part 107, the first positioning (alignment) part 71, the second positioning (alignment) part 73 and a circuit board holder 130. The connecting part 107 is a cylinder which extends, with respect to the front surface 101, in the front direction which is orthogonal to the front surface 101. The connecting part 107 has the supply port 109 opened in the front direction at a center of the connecting part 107. The supply port 109 of the connecting part 107 is a supply port via which the ink is supplied from the liquid container 100 to the outside of the liquid container 100. The connecting part 107 extends from the front surface 101 in an opening direction of the supply port 109. Further, a sealing member (omitted in the drawings) is provided on a part which is located on the back side (on the rear side) of the supply port 109. In a case, for example, that the cartridge 30 is detached from the installment part 7 and connection between the supply port 109 of the connecting part 107 and the supply needle 9 is released, any leaking of the ink from the supply port 109 is suppressed by the sealing member.

The first positioning part 71 is provided on a position which is obliquely lower left with respect to the supply port 109, in a crossing direction which crosses the opening direction (front direction) of the supply port 109. The circular hole 72 of which opening is circular is provided on a front end part of the first positioning part 71. The second positioning part 73 is provided on a position which is obliquely lower right with respect to the supply port 109, in the crossing direction which crosses the opening direction (front direction) of the supply port 109. The elongated hole 74 of which opening is elongated in a lateral direction is provided on a front end part of the second positioning part 73.

Further, the first positioning part 71 extends from the front surface 101 in the opening direction of the supply port 109. Furthermore, the second positioning part 73 extends from the front surface 101 in the opening direction of the supply port 109. Moreover, the positional relationship among the supply port 109 of the connecting part 107, the first positioning part 71 and the second positioning part 73 is same as the positional relationship among the supply needle 9, the positioning projection 611 and the positioning projection 612 which are provided on the first accommodating part 61. In a case that the cartridge 30 is inserted into the first accommodating part 61, the supply port 109, the first positioning part 71 and the second positioning part 73 are provided on positions, respectively, facing the supply needle 9, the positioning projection 612 and the positioning projection 611.

<Configurations of Circuit Board 140 and Circuit Board Holder 130>

As depicted in FIGS. 5 to 8, the tap 105 is provided with the circuit board holder 130 at a location above the supply port 109. Namely, the circuit board holder 130 is provided at a position being more apart (farther) from the bottom surface 106 of the liquid container 100 than the supply port 109 is (that is, a position higher than the supply port 109 with reference to the bottom surface 106). Specifically, the circuit board holder 130 is provided at a farther (higher) position such that a height of the circuit board holder 130 from the bottom surface 106 of the liquid container 100 is larger than a height of the supply port 109 from the bottom surface 106 of the liquid container 100. The circuit board holder 130 holds a circuit board 140 detachably. The circuit board 140 has an electronic circuit built therein, and the electric contact (electric contact point) 141 is exposed from the circuit board 140. The circuit board 140 stores information regarding a remaining amount of the liquid stored in the liquid container 100. An example of the circuit board 140 is an IC chip. The circuit boards 140 is held by the circuit board holder 130 in a state that a surface, of the circuit board 140, on which the electric contact 141 is provided faces (is oriented) upward. Note that the electric contact 141 of the circuit board 140 makes contact with an electric contact 613 (see FIG. 3) provided on the first accommodating part 61.

As depicted in FIG. 6, the circuit board holder 130 is provided with a first holding member 131, a second holding member 132 and an urging member 170. An example of the urging member 170 is a coil spring. The first holding member 131 has a shape of a tube of which upper end part is closed, and holds the circuit board 140 at the upper end part the tube. The second holding member 132 is held movably in the up-down direction in the inside of a tube of the first holding member 131, and is provided with a projecting part 132A which projects downward and arranged at a lower end part of the second holding member 132. The projecting part 132A is provided, respectively on a front part and a rear part thereof, with an inclined surface 132AA and an inclined surface 132AB. Further, the urging member 170 is provided on the inside of the second holding member 132; the first holding member 131 is connected or linked to one end 171 of the urging member 170; and the second holding member 132 is connected or linked to the other end 172 of the urging member 170. Accordingly, the first holding member 131 holds the urging member 170 together with the second holding member 132 in a state that the urging member 170 is interposed (pinched or sandwiched) between the first holding member 131 and the second holding member 132.

As depicted in FIG. 5, the first accommodating part 61 is provided with a projecting part 150 which projects from the upper side to the lower side. The projecting part 150 is provided, in the front-rear direction of the printer 1, with an inclined surface 150A and an inclined surface 150B. In a case that the cartridge 30 is installed in the printer 1, the projecting part 150 makes contact with an upper end of the first holding member 131. Further, the first accommodating part 61 is provided with an inclined part 161. The inclined part 161 is provided with an inclined surface 161A which is inclined upward with respect to an installing direction of the cartridge 30 with respect to the printer 1. The inclined part 161 is provided with a horizontal surface 161B which is connected to an upper part of the inclined surface 161A. In the case that the cartridge 30 is installed in the printer 1, the projecting part 132A of the second holding member 132 makes contact with the inclined surface 161A of the inclined part 161. In a state that installment of the cartridge 30 with respect to the first accommodating part 61 is completed, the projecting part 132A of the second holding member 132 is held by the horizontal surface 161B. As depicted in FIG. 3, the first accommodating part 61 is provided with the electric contact 613. In the state that the installment of the cartridge 30 with respect to the first accommodating part 61 is completed, the electric contact 141 of the circuit board 140 contacts the electric contact 613.

<Installment and Detachment of Cartridge 30 and Effect of Embodiment>

In a case that the cartridge 30 is to be installed in the printer 1, an user opens the front cover 23 of the printer 1, and inserts the cartridge 30 into the first accommodating part 61 as depicted in FIG. 4. Further, in a case that the ink becomes insufficient during usage of the printer 1 and that an instruction of replacing the cartridge 30 is displayed on the displaying part 3, the user opens the front cover 23 of the printer 1 and exchanges the cartridge 30. In these cases, the position of the supply port 109 is positioned (aligned) with respect to the supply needle 9 by the first positioning part 71 and the second positioning part 73, and the cartridge 30 is installed in the first accommodating part 61. Further, the electric contact 141 of the circuit board 140 held by the circuit board holder 130 contacts the electric contact 613 on the side of the printer 1. Accordingly, the printer 1 is capable of obtaining the information regarding the remaining amount of the ink stored in the cartridge 30, and the printer 1 is also capable of writing information regarding an used amount of the ink to the circuit board 140.

Figure 9:
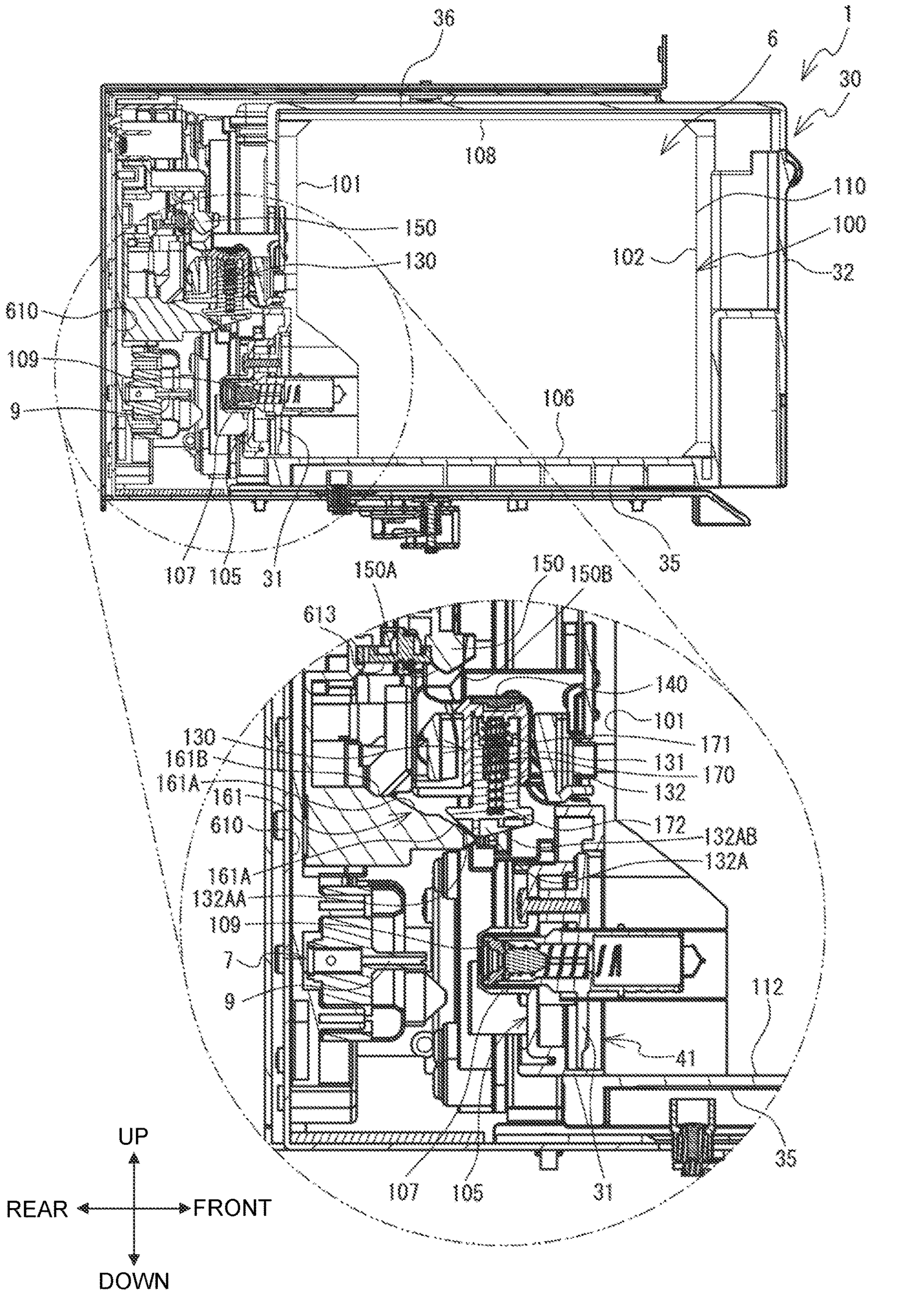
FIG. 9 is a vertical cross-sectional view depicting a state that the cartridge 30 is being installed in the accommodating part 6.
Figure 10:
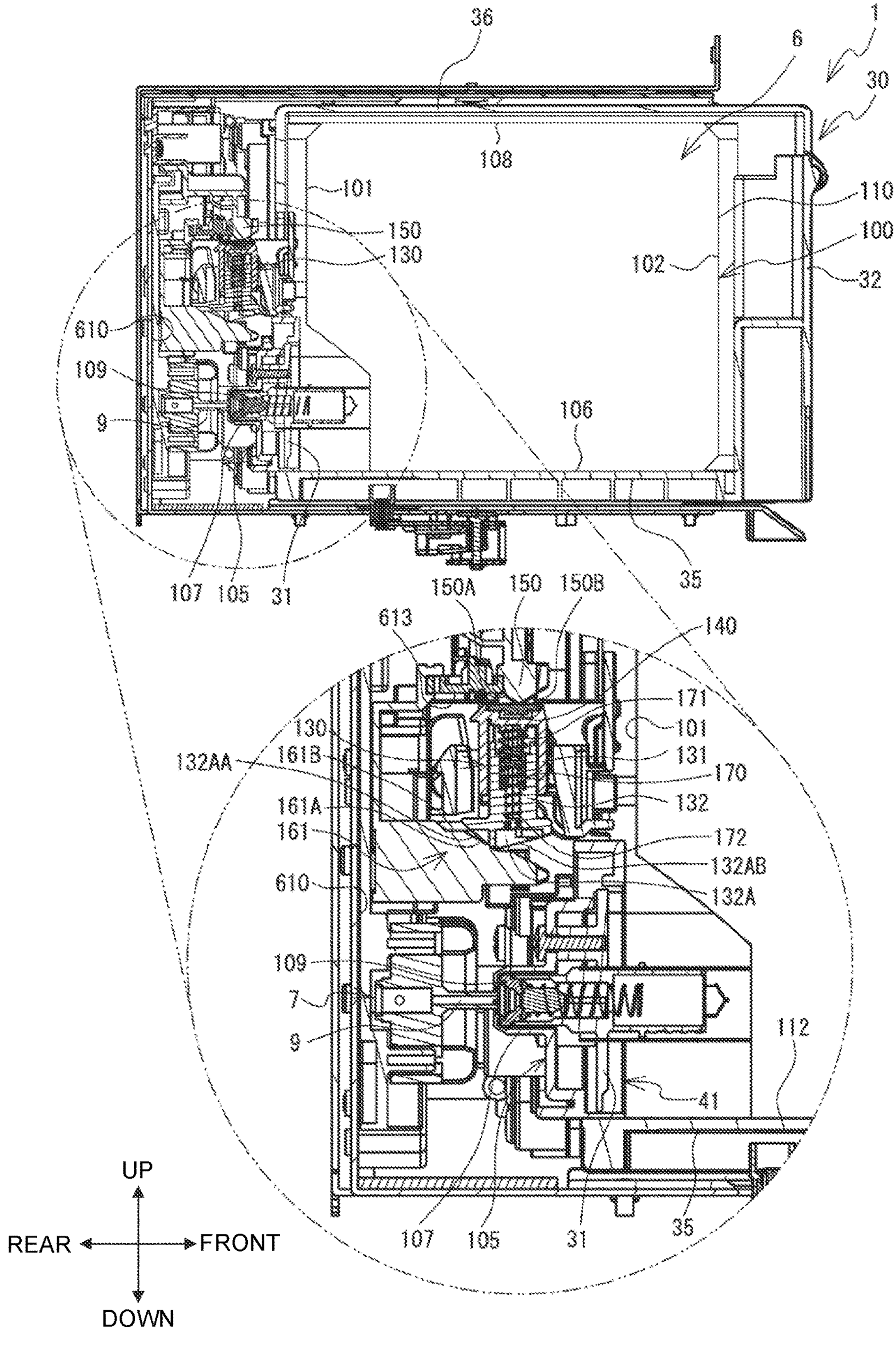
FIG. 10 is a vertical cross-sectional view depicting a state that the cartridge 30 is being installed in the accommodating part 6.
Figure 11:
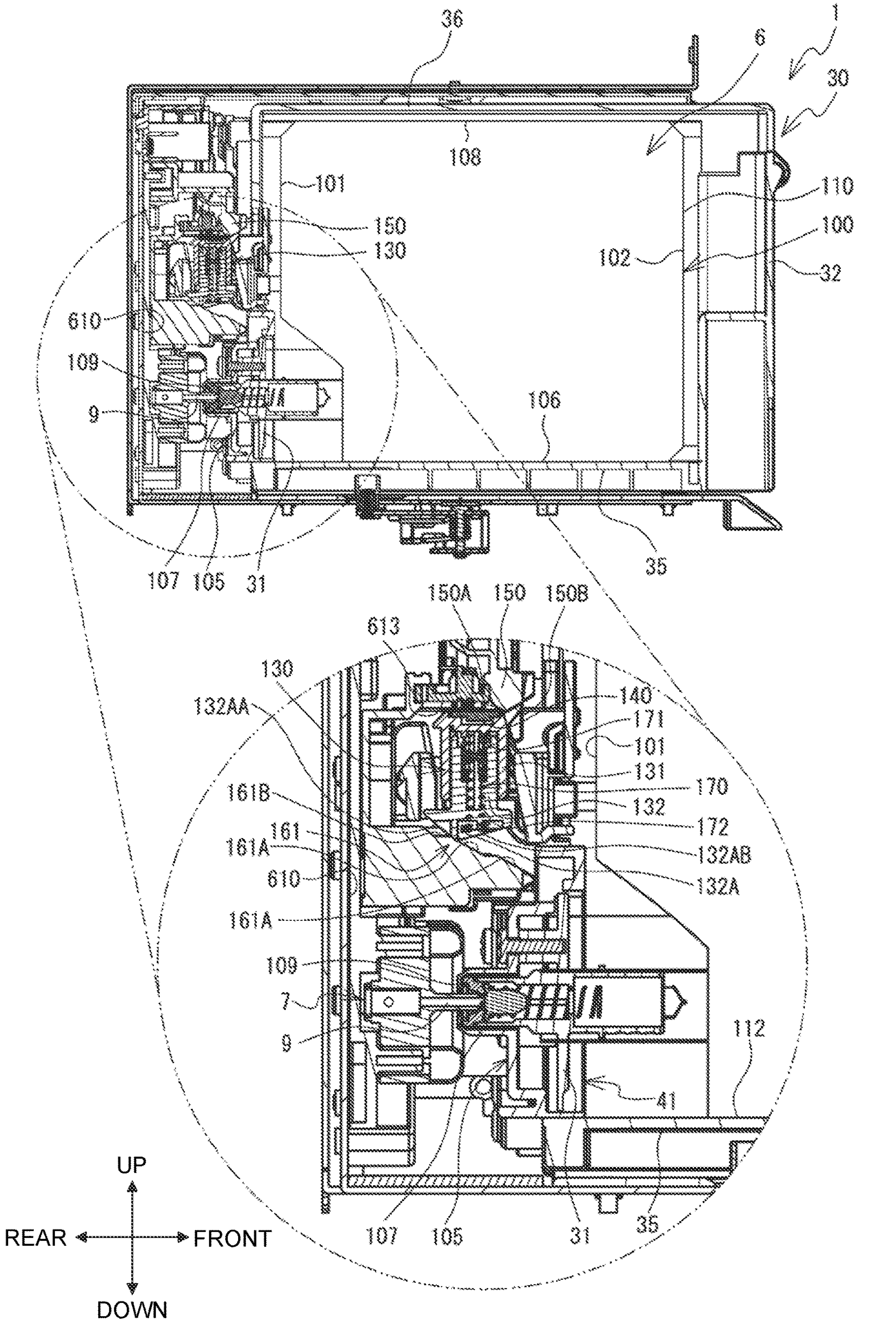
FIG. 11 is a vertical cross-sectional view depicting a state that the cartridge 30 is being installed in the accommodating part 6.

With reference to FIGS. 5 and 9 to 11, an operation of the circuit board holder 130 in a case of installing the cartridge 30 with respect to the first accommodating part 61 will be explained. FIG. 5 depicts a state that the installment of the cartridge 30 with respect to the first accommodating part 61 is completed, and FIGS. 9 to 11 depict, sequentially, a state that the installment of the cartridge 30 with respect to the first accommodating part 61 is being progressed. First, as depicted in FIG. 9, at a position of the cartridge 30 that the supply needle 9 is not inserted into the supply port 109, the first holding member 131 of the circuit board holder 130 does not make contact with the projecting part 150 of the first accommodating part 61. Further, the projecting part 132A of the second holding member 132 does not make contact with the inclined part 161 of the first accommodating part 61.

As depicted in FIG. 10, in a case that the cartridge 30 is inserted, in the inside of the first accommodating part 61, deeply (to the rear side) toward the rear wall 610, the inclined surface 132AA of the projecting part 132A of the second holding member 132 makes contact with the inclined surface 161A of the inclined part 161. In this situation, an upper end part of the first holding member 131 makes contact with the inclined surface 150A of the projecting part 150. Accordingly, by the contact made by the first holding member 131 with respect to the projecting part 150 and the contact made by the second holding member 132 with respect to the inclined part 161, the urging member 170 is pinched (sandwiched) between the first holding member 131 and the second holding member 132, which in turn causes the urging member 170 to contract.

Next, as depicted in FIG. 11, in a case that the cartridge 30 is inserted, in the inside of the first accommodating part 61, further deeply (to the rear side) toward the rear wall 610, the projecting part 132A of the second holding member 132 is guided up to an upper end of the inclined part 161. In this situation, the upper end part of the first holding member 131 is started to be released from the contact with respect to the projecting part 150.

Next, as depicted in FIG. 5, in a case that the cartridge 30 is inserted, in the inside of the first accommodating part 61, furthermore deeply (to the rear side) toward the rear wall 610, the projecting part 132A of the second holding member 132 has finished climbing the inclined surface 161A of the inclined part 161, makes contact with and is held by the horizontal surface 161B. In this situation, the upper end part of the first holding member 131 does not make contact with the projecting part 150. The contact made by the first holding member 131 with respect to the projecting part 150 is released and the urging member 170 expands (is elongated) upward, thereby causing the electric contact 141 of the circuit board 140 to make contact with the electric contact 613 (see FIG. 3), of the printer 1, which is positioned above the electric contact 141. The horizontal surface 161B of the inclined part 161 supports the circuit board holder 130 which has been moved upward. Accordingly, the circuit board 140 is held at a farther position (higher position) at which the circuit board 140 is more apart or away from the bottom surface 106 than the supply port 109 is). Thus, a possibility that a liquid scattered from the supply port 109 might adhere to the electric contact 141 of the circuit board 140 is further lowered. Accordingly, the reliability of the conduction of the electric contact 141 of the circuit board 140 is improved.

The printer 1 is capable of causing the cartridge 30 configured as described above to be installed therein. Accordingly, the printer 1 makes such a possibility that, in a case that the cartridge is inserted or removed in the printer 1, the liquid scattered from the supply port 109 of the liquid container 100 might adhere to the electric contact 141 of the circuit board 140, to be lowered. Accordingly, the reliability of the conduction of the electric contact 141 of the circuit board 140 is improved.

In the above-described embodiment, the cartridge 30 is an example of a "liquid storing cartridge". The case 110 is an example of a "casing".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The liquid container 100 is not limited to being box-shaped. Although the liquid container 100 stores the ink, the liquid container 100 is not limited to this. For example, the liquid container 100 may store a liquid different from the ink. For example, the liquid container 100 may store a preservative liquid (storage liquid, shipping liquid) which is introduced to the ink tube 48 connecting the cartridge 30 and the ink-jet head 8 for a purpose of suppressing any solidification of the ink inside the ink tube 48, in a case that the printer 1 is shipped or in a case that the printer 1 is stored for a long period of time. Further, it is also allowable to omit the lower case 37 and the cover 36 of the cartridge 30, and to install the liquid container 100 directly in the printer 1.

In the above-described embodiment, although the ink is, for example, the black ink, the ink is not limited to or restricted by this. For example, the ink may be an ink such as a cyan ink, a magenta ink, a yellow ink, a white ink or a clear ink, etc.

In the above-described embodiment, although the liquid container 100 has the shape of rectangular parallelepiped, the liquid container 100 is not limited to this. For example, the shape of the liquid container 100 may be a shape of another polyhedron, or may be cylindrical. Further, it is allowable that the liquid container 100 does not have a shape which is symmetrical in the front-rear direction. Furthermore, the urging member 170 is not limited to the coil spring, and may be an elastic body which is made of a rubber, a synthetic resin, etc.

In the above-described embodiment, although the tap 105 is provided on a position which is biased toward the left side surface 104 in the left-right direction, the arrangement of the tap 105 is not limited to this. For example, the tap 105 may be provided on a position which is biased toward the right side surface 103. In such a case, the installment part 7 of the first accommodating part 61 may be provided on a position corresponding to the arrangement position of the tap 105. In the above described embodiment, the first holding member 131 is provided in the tap (tap unit) 105 such that the holding member 131 is capable of moving in the up-down direction relative to the liquid container 100. However, the first holding member 131 may be fixed with respect to the container 100 such that the first holding member 131 is not capable of moving in the up-down direction relative to the liquid container 100.

What is claimed is:

1. A liquid storing cartridge comprising:

a casing which comprises a bottom surface and a side surface crossing the bottom surface, and which is configured to store a liquid, the casing comprising a supply port, provided in the side surface, configured to supply the liquid from the casing to an outside of the casing;

a circuit board comprising an electric contact; and a circuit board holder which is provided on the casing and which is configured to hold the circuit board, wherein:

the circuit board is provided at a position being more apart from the bottom surface of the casing than the supply port is;

the circuit board holder is provided at the position being more apart from the bottom surface of the casing than the supply port is; and the circuit board holder is provided with an urging member configured to urge the circuit board in a direction away from the bottom surface of the casing.

2. The liquid storing cartridge according to claim 1, wherein in a process of installing the liquid storing cartridge in a printer, the circuit board holder is configured to move the circuit board in the direction away from the bottom surface of the casing.

3. The liquid storing cartridge according to claim 2, wherein:

the circuit board holder includes:

a first member which is connected to a first end of the urging member and which is configured to hold the circuit board, and a second member connected to a second end of the urging member, the urging member being interposed between the first and second members;

in a first step of the process of installing the liquid storing cartridge in the printer:

the first member is configured to make contact with a projection which is a part of the printer and which projects downward;

the second member is configured to make contact with an inclined part which is a part of the printer and which is inclined upward with respect to an installment direction, the liquid storing cartridge being installed in the printer in the installment direction; and the urging member is configured to contract by being pinched due to contact between the first member and the projection, and contact between the second member and the inclined part;

in a second step, following the first step, of the process of installing the liquid storing cartridge in the printer, the electric contact of the circuit board is configured to make contact with an electric contact of the printer positioned above the electric contact of the circuit board, via an upward expansion of the urging member due to dissolving of the contact between the first member and the projection; and in a case that the process of installing the liquid storing cartridge in the printer is completed, the electric contact of the circuit board is configured to maintain contact between the electric contact of the circuit board and the electric contact of the printer via the second member being supported by the inclined part.

4. The liquid storing cartridge according to claim 1, wherein:

the circuit board holder is provided on the side surface of the casing; and the circuit board is arranged such that the supply port is interposed between the circuit board and the bottom surface in a crossing direction crossing the bottom surface.

5. The liquid storing cartridge according to claim 4, wherein the circuit board holder includes:

a first member which is provided on the side surface and which is configured to move in the crossing direction relative to the casing; and a second member which is engaged with the first member, and which is configured to move in the crossing direction relative to the first member, wherein the urging member is configured to urge the first and second members in first and second directions, respectively, the first and second directions being directions each of which is along the crossing direction and in which the first member and the second member move away from each other.

6. The liquid storing cartridge according to claim 4, wherein the electric contact of the circuit board faces away from the supply port in the crossing direction.

7. A printer comprising the liquid storing cartridge as defined in claim 1.

8. A liquid storing cartridge comprising:

a casing which comprises a bottom surface and a side surface crossing the bottom surface, and which is configured to store a liquid, the casing comprising a supply port, provided in the side surface, configured to supply the liquid from the casing to an outside of the casing;

a circuit board comprising an electric contact; and a circuit board holder which is provided on the casing and which is configured to hold the circuit board, wherein the circuit board is provided at a position being more apart from the bottom surface of the casing than the supply port is;

wherein in a process of installing the liquid storing cartridge in a printer, the circuit board holder is configured to move the circuit board in a direction away from the bottom surface of the casing;

wherein:

the circuit board holder includes:

a first member which is connected to a first end of an urging member and which is configured to hold the circuit board, and a second member connected to a second end of the urging member, the urging member being interposed between the first and second members;

in a first step of the process of installing the liquid storing cartridge in the printer:

the first member is configured to make contact with a projection which is a part of the printer and which projects downward;

the second member is configured to make contact with an inclined part which is a part of the printer and which is inclined upward with respect to an installment direction, the liquid storing cartridge being installed in the printer in the installment direction; and the urging member is configured to contract by being pinched due to contact between the first member and the projection, and contact between the second member and the inclined part;

in a second step, following the first step, of the process of installing the liquid storing cartridge in the printer, the electric contact of the circuit board is configured to make contact with an electric contact of the printer positioned above the electric contact of the circuit board, via an upward expansion of the urging member due to dissolving of the contact between the first member and the projection; and in a case that the process of installing the liquid storing cartridge in the printer is completed, the electric contact of the circuit board is configured to maintain contact between the electric contact of the circuit board and the electric contact of the printer via the second member being supported by the inclined part.

9. A liquid storing cartridge comprising:

a casing which comprises a bottom surface and a side surface crossing the bottom surface, and which is configured to store a liquid, the casing comprising a supply port, provided in the side surface, configured to supply the liquid from the casing to an outside of the casing;

a circuit board comprising an electric contact; and a circuit board holder which is provided on the casing and which is configured to hold the circuit board, wherein the circuit board is provided at a position being more apart from the bottom surface of the casing than the supply port is;

wherein:

the circuit board holder is provided on the side surface of the casing; and the circuit board is arranged such that the supply port is interposed between the circuit board and the bottom surface in a crossing direction crossing the bottom surface; and wherein the circuit board holder includes:

a first member which is provided on the side surface and which is configured to move in the crossing direction relative to the casing;

a second member which is engaged with the first member, and which is configured to move in the crossing direction relative to the first member; and an urging member configured to urge the first and second members in first and second directions, respectively, the first and second directions being directions each of which is along the crossing direction and in which the first member and the second member move away from each other.

* * * * *